(12) United States Patent
Hussain et al.

(10) Patent No.: US 6,591,105 B1
(45) Date of Patent: Jul. 8, 2003

(54) SYSTEM AND METHOD FOR MANAGING ACCESS IN CELLULAR NETWORK WITH MULTIPLE PROFILES

(75) Inventors: Tahir Hussain, Dallas, TX (US); Ranjit Bhatia, Lewisville, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/475,099

(22) Filed: Dec. 30, 1999

(51) Int. Cl.[7] .................................................. H04Q 7/20
(52) U.S. Cl. ...................... 455/444; 455/417; 455/422; 455/465; 455/433
(58) Field of Search ................................ 455/444, 440, 455/435, 555, 436, 433, 465, 426, 554

(56) References Cited

U.S. PATENT DOCUMENTS

| | | | | |
|---|---|---|---|---|
| 5,689,547 A | * | 11/1997 | Molne | 379/58 |
| 5,946,622 A | * | 8/1999 | Bojeryd | 455/444 |
| 6,108,540 A | * | 8/2000 | Sonti et al. | 455/433 |
| 6,119,001 A | * | 9/2000 | Delis et al. | 455/433 |
| 6,219,539 B1 | * | 4/2001 | Basu et al. | 455/417 |
| 6,359,880 B1 | * | 3/2002 | Curry et al. | 370/352 |
| 6,400,950 B1 | * | 6/2002 | Patel et al. | 455/435 |
| 6,449,479 B1 | * | 9/2002 | Sanchez | 455/433 |

FOREIGN PATENT DOCUMENTS

| WO | WO 97/38542 | * 10/1997 | ............ H04Q/7/32 |
|---|---|---|---|

* cited by examiner

Primary Examiner—Nay Maung
Assistant Examiner—Tanmay Lele
(74) Attorney, Agent, or Firm—Jenkens & Gilchrist, P.C.

(57) ABSTRACT

A telecommunications system and method is disclosed for allowing business indoor mobile subscribers having multiple profiles to access both the business indoor network and the Public Land Mobile Network (PLMN) using one mobile terminal. To implement this dual-network service, a toggle feature can be provided to allow a business indoor mobile subscriber to choose between different subscriber profiles. Thus, if a mobile subscriber currently has the business indoor profile active and wishes to access the PLMN while roaming outside the business indoor cell(s), the mobile subscriber can initiate this toggle feature, and upon acknowledgment and authentication by the PLMN, the mobile subscriber can have access to the PLMN.

25 Claims, 5 Drawing Sheets

SYSTEM AND METHOD FOR MANAGING ACCESS IN CELLULAR NETWORK WITH MULTIPLE PROFILES

BACKGROUND OF THE PRESENT INVENTION

1. Field of the Invention

The present invention relates generally to telecommunications systems and methods for allowing mobile subscribers to access cellular networks, and specifically to allowing mobile subscribers to select between multiple profiles to access cellular networks.

2. Background of the Present Invention

Within the Global System for Mobile Communications (GSM) standards, there are features and capabilities defined which allow groups of mobile subscribers to be managed according to a number of operator specific criteria, e.g., CAMEL or USSD. Future trends in GSM system platform development are geared towards customized system solutions to enhance radio access solutions to take into account, for example, indoor environments, such as micro and pico cells within an office building.

One such customized solution is the Localized Service Area (LSA), which offers subscribers or groups of subscribers different service features, costs and access rights within a regionally restricted area or areas. The LSA concept is especially beneficial for businesses by allowing a company to provide cellular service to its employees while located within the building or buildings constituting the company.

An LSA may be defined for the business system or home zone, and may include one or more cells. Special tariffs or special sets of service features may be provided for certain subscribers within the LSA. The cells of the LSA may be contiguous or distributed among one more locations. For example, one cell may be located in one city, while another cell belonging to the same LSA may be located in another city. As long as a single LSA-ID is utilized to identify the LSA in the network, the LSA is treated as a single logical entity.

To control roaming between LSA's and the Public Land Mobile Network (PLMN), a standard called Support of Localized Service Area (SoLSA) has been proposed. Under SoLSA, a mobile subscriber can roam freely between the LSA and the PLMN based on the assigned cell profile and the individual LSA subscriber profiles. Within the LSA cells, the assigned LSA cell profile could be, for example, "exclusive" access or "preferential" access. Under "exclusive" access, cells in the LSA are for the exclusive use of LSA subscribers. By contrast, under "preferential" access, both LSA subscribers and non-LSA subscribers may access the LSA radio resources, but some radio resources in the LSA cells are reserved to provide preferential access to LSA subscribers.

For the individual LSA subscribers, the LSA subscriber profile could be, for example, "LSA-only" access or "all" access. Under the "LSA-only" access, an LSA subscriber is allowed to access the PLMN within the subscriber's allowed LSA, but is not allowed to receive or originate calls outside of the LSA. Non-LSA subscribers may receive or originate calls inside or outside the LSA, provided the LSA is not an exclusive access LSA. Under the "all" access, the LSA subscriber may receive or originate calls inside or outside of the LSA. Different charging may apply to calls placed inside or outside the LSA.

Normally, LSA subscribers are allowed "all" access at certain times of the day, such as after 5:00 p.m. and on weekends. Thus, LSA subscribers typically have two profiles, "LSA-only" during business hours and "all" for all other times. The restriction of LSA-only access during business hours protects the company offering LSA service. For example, to offer LSA service, a company must typically reserve some radio resources from the PLMN and pay a group rate for these radio resources. Depending on the location of the base station within the LSA, an LSA subscriber near a window may receive a stronger signal from the PLMN base station. However, since the company has already paid for the radio resources, the company and the employee will want to prevent the employee from being charged for PLMN radio resources while located within the LSA. Therefore, the LSA subscriber profiles may be set by the company to only allow LSA access during business hours.

Another customized solution for the business/indoor environment is the GSM over the Net, which utilizes the H.323 protocol to transmit voice and/or data via the Transmission Control Protocol over the Internet Protocol (TCP/IP) over a local area network (LAN). Within an H.323 system implementing a GSM cellular network, the GSM cellular network is considered one H.323 endpoint. Other H.323 endpoints can include, for example, a personal computer, or an IP-based telephone. Roaming between the H.323 system and the PLMN presents similar problems as that discussed above in connection with LSA's. Thus, H.323 mobile subscribers may also have multiple profiles, assigning priority to either the H.323 network or the PLMN based upon the time of day, in order to prevent PLMN roaming during business hours.

However, in some cases, the LSA or H.323 mobile subscriber may be working remotely, and may need to access the PLMN to place a call. Currently, the LSA or H.323 mobile subscriber must purchase a different mobile telephone (terminal) and obtain a different subscription to place calls outside the business area or home zone during business hours. This is neither convenient nor desirable for business indoor subscribers.

SUMMARY OF THE INVENTION

The present invention is directed to telecommunications systems and methods for allowing business indoor mobile subscribers having multiple profiles to access both the business indoor network and the PLMN network using one mobile terminal. To implement this dual-network service, a toggle feature can be provided to allow a mobile subscriber to choose between different subscriber profiles. Thus, if a mobile subscriber currently has the business indoor profile active and wishes to access the PLMN while roaming outside the business indoor cell(s), the mobile subscriber can initiate this toggle feature, and upon acknowledgment and authentication by the PLMN, the mobile subscriber can have access to the PLMN. The toggle feature can be implemented using a dedicated switch, service code or can be selected from a menu-driven system within the mobile terminal or within the network.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
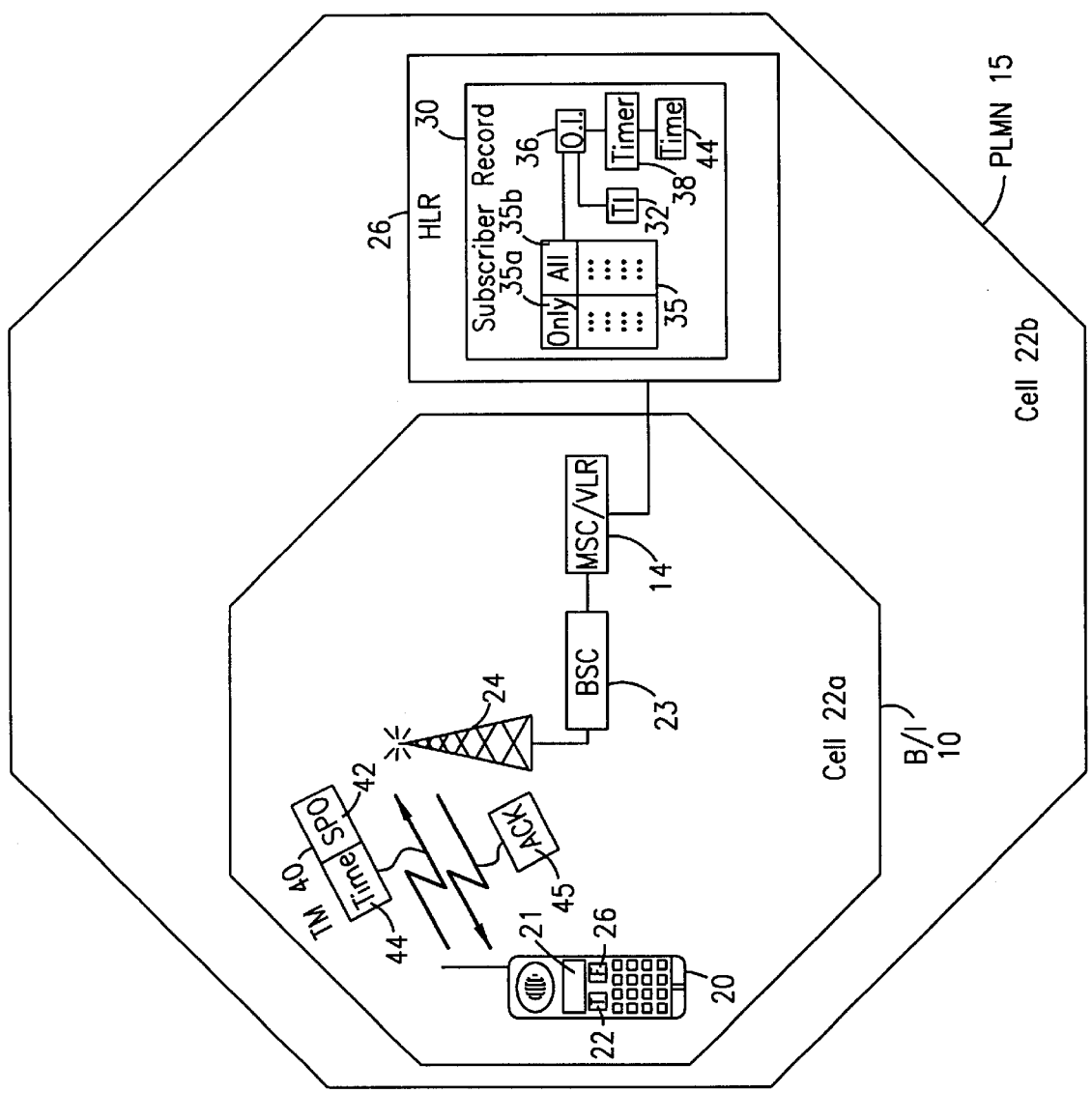
FIG. 1 is an exemplary block diagram illustrating the selection of a subscriber profile by a business indoor mobile subscriber.

With reference now to FIG. 1 of the drawings, selection of a particular subscriber profile 35 stored within a Home Location Register (HLR) 26 by a business indoor mobile subscriber is shown. In order to prevent roaming into the Public Land Mobile Network (PLMN) 15 during business hours, many companies that offer business indoor cellular service to their employees restrict the ability of their employees to place calls outside of the business indoor network 10 during business hours. This benefits not only the company, but also the employee.

For example, if an employee is near the edge of the business indoor network 10, such that the signal from a cell 22b within the PLMN 15 is stronger than the signal from a cell 22a within the business indoor network 10, a Mobile Station (MS) 20, which is the terminal equipment used by the mobile subscriber to access the cellular networks 10 and 15, would normally register with the PLMN 15 instead of the business indoor network 10. This is undesirable for both the company and the employee. Companies normally purchase a group of radio resources (frequencies) from the PLMN 15 for use in the business indoor network 10 for a certain fee. If the employee is not utilizing the radio resources of the business indoor network 10, the company is paying for radio resources that are not needed.

In addition, in order for the employee to access the PLMN 15, the employee must have a personal subscription to the PLMN 15. Therefore, calls placed by the employee within the PLMN 15 will be charged directly to that employee, instead of to the company. If the employee is located within the area covered by the business indoor network 10, the employee most likely will not want to incur personal charges for calls that the employee thinks are being placed within the business indoor network 10, but actually are being placed within the PLMN 15.

Therefore, many business indoor subscribers that have access to both the business indoor network 10 and the PLMN 15 have at least two different subscriber profiles 35a and 35b stored in the HLR 26 that serves that business indoor subscriber. A first profile 35a may state, for example, "business indoor access only between the hours of 8:00 a.m. and 5:00 p.m., weekdays." A second profile 35b may state, for example, "all access between the hours of 5:00 p.m. and 8:00 a.m., weekdays, and from 5:00 p.m. Friday through 8:00 a.m. Monday." This prevents undesired access to the PLMN 15 during normal business hours.

However, in some instances, a business indoor mobile subscriber may want to have access to the PLMN 15 during normal business hours (or the hours that are restricted to only business indoor use). Therefore, a toggle feature can be provided to the business indoor mobile subscriber to allow selective switching between the business indoor network 10 and the PLMN 15 during hours such switching would otherwise be prohibited. The toggle feature can be selected by using a dedicated switch 22 on the MS 20, by entering a service code, e.g., *xx, on the MS 20 or by using a menu-driven system within the MS 20 or within the HLR 26.

For example, if the menu-driven system is within the HLR 26, the business indoor mobile subscriber can use the Wireless Application Protocol (WAP) to access a menu-driven browser (not shown) in the HLR 26 via the Internet (not shown). Alternatively, if the menu-driven system is within the MS 20, the business indoor mobile subscriber can use one or more function keys 26 on the MS 20 to select the toggle feature from a menu displayed on a display 21 of the MS 20.

If the toggle feature is selected on the MS 20 (by use of a dedicated switch 22, service code or menu selection on the MS 20), the MS 20 sends a toggle message 40, such as an Unstructured Supplementary Service Data (USSD) message, including the toggle feature, and if possible, a selected profile option 42, which corresponds to the "all" access profile 35b or the "business indoor-only" access profile 35a, to the HLR 26 via a serving Base Transceiver Station (BTS) 24, Base Station Controller (BSC) 23 and Mobile Switching Center/Visitor Location Register (MSC/VLR) 14. The toggle message 40 requests the HLR 26 to toggle the current subscription profile 35.

Sending a selected profile option 42 may be beneficial if the business indoor subscriber has more than two profiles 35, or if the selected profile option 42 corresponds to the current profile 35. For example, if the business indoor subscriber knows that he or she will need to place calls within the PLMN 15 the next day, but does not plan on going into the office, the business indoor subscriber can select option 42 corresponding to the "all" access profile 35b during the time that "all" access is allowed to ensure that the "business indoor-only" access 35a will not be activated the next day.

In response to the toggle message 40, the HLR 26 accesses a subscriber record 30 associated with the business indoor mobile subscriber to determine if the business indoor mobile subscriber is allowed to switch the profile designation. For example, a company might want to give this toggle feature to only select employees that travel extensively or have a need to make PLMN 15 calls during business hours. Therefore, a toggle indication 32 that the business indoor mobile subscriber is allowed to toggle the profile designation can be stored in the subscriber record 30 associated with this business indoor mobile subscriber. If the business indoor mobile subscriber is allowed to toggle the profile designation, the HLR 26 will switch the subscriber profile 35, set an override indication 36 within the subscriber record 30 to prevent the subscriber profile 35 from being switched back, and preferably provide an acknowledgment message 45 to the MS 20.

During the time that the other profile 35 (or selected profile option) is in effect, the features and charging associated with that subscriber profile 35 are also in effect. For example, if the "all" access profile 35b is switched to, the business indoor subscriber would typically be charged for all calls that occur in PLMN 15 cells 22b, even if the business indoor subscriber is within the business indoor network 10. For example, if the business indoor subscriber is near the edge of the business indoor network 10, and the signal from the PLMN cell 22b is stronger, the MS 20 will register with the PLMN 15.

It should be understood that the business indoor subscriber may not be able to send the toggle message 40 to the HLR 26 if the business indoor subscriber is not allowed access to the network currently serving the MS 20. If, for example, the business indoor subscriber is outside of the business indoor network 10 during business hours, the business indoor subscriber will not be able to register with a PLMN 15 to send this toggle message 40. Therefore, the toggle message 40 may only be sent by the MS 20 when the business indoor subscriber is within the business indoor network 10 when the "business indoor-only" access profile 35a is active, or within the business indoor network 10 or PLMN 15 when the "all" access profile 35b is active.

Once the HLR 26 switches the subscriber profile 35, this switched-to subscriber profile 35 will remain in effect until either the HLR 26 automatically switches the subscriber profile 35 back (removes the override indication 36) or the business indoor subscriber requests the HLR 26 to switch the subscriber profile 35 back again. In preferred embodiments, with the menu-driven system, the business indoor subscriber selects a time period 44 that the selected profile option 42 should remain in effect, and sends this time period 44 in the toggle message 40 to the HLR 26. For example, if the business indoor subscriber currently has "business indoor-only" access 35a, and requests the HLR 26 to toggle to "all" access 35b for a designated time period 44, the HLR 26 can remove the override indication 36 and switch the subscriber profile back to "business indoor-only" access 35a after the expiration of a timer 38 within the HLR 26 that is initialized with the transmitted designated time period 44. Alternatively, the designated time period 44 can be pre-selected by the business indoor operator or the business indoor subscriber, and stored in the business indoor subscriber record 30.

In an alternative embodiment, the HLR 26 can remove the override indication 36 and switch the subscriber profile back to "business indoor-only" access 35a the next time "business indoor-only" access 35a would normally be in effect. For example, if the business indoor subscriber toggles the subscriber profile to "all" access 35b at noon on a Tuesday, the HLR 26 can switch the subscriber profile back to "business indoor-only" access 35a at 8:00 a.m. the following Wednesday. In a further alternative embodiment, the switched-to subscriber profile 35 can remain in effect until the business indoor subscriber sends another toggle message (not shown) to the HLR 26, indicating that the override indication 36 should be removed and the subscriber profile 35 should be switched back. In a still further alternative embodiment, the HLR 26 could prompt the business indoor subscriber to send another toggle message at the expiration of the timer 38 or at the next normal occurrence of the switched-from subscriber profile 35, by sending, for example, a Short Message Service (SMS) or USSD message to the MS 20, requesting the business indoor subscriber to send another toggle message.

Figure 2:
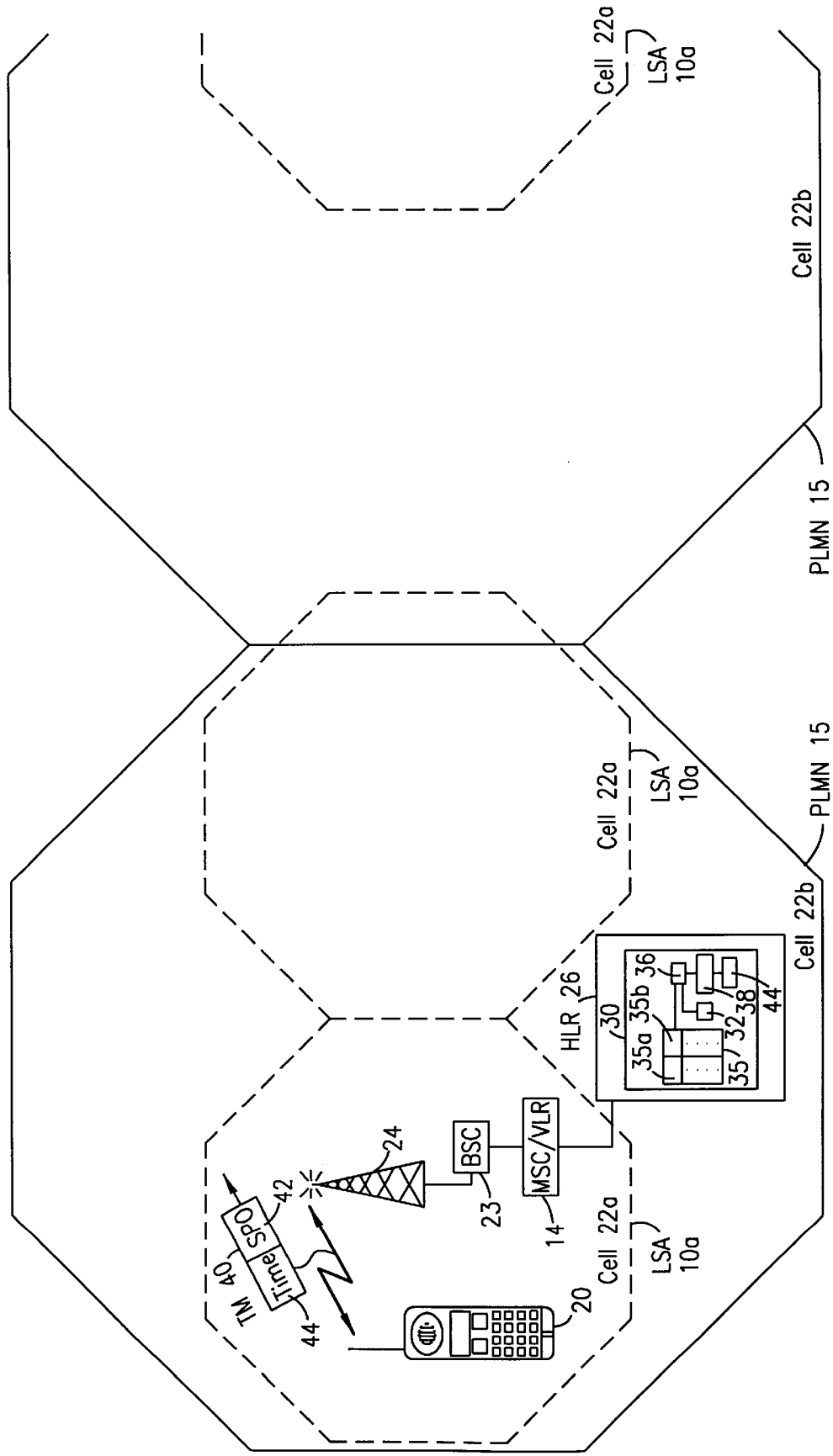
FIG. 2 is an exemplary block diagram illustrating the selection of a subscriber profile by a localized service area mobile subscriber.

The above described toggling method applies to any type of business indoor network 10, where multiple profiles are needed for subscribers. For example, one type of business indoor network 10 is a Localized Service Area (LSA). As shown in FIG. 2 of the drawings, an LSA 10a can consist of a cell 22a or a number of cells 22a within one or more PLMN's 15. LSA cells 22a can be implemented on top of existing PLMN cells 22b, with coverage overlapping between LSA cells 22a and PLMN cells 22b. In addition, the cells 22a constituting the LSA 10a may not necessarily provide continuous coverage.

Figure 3:
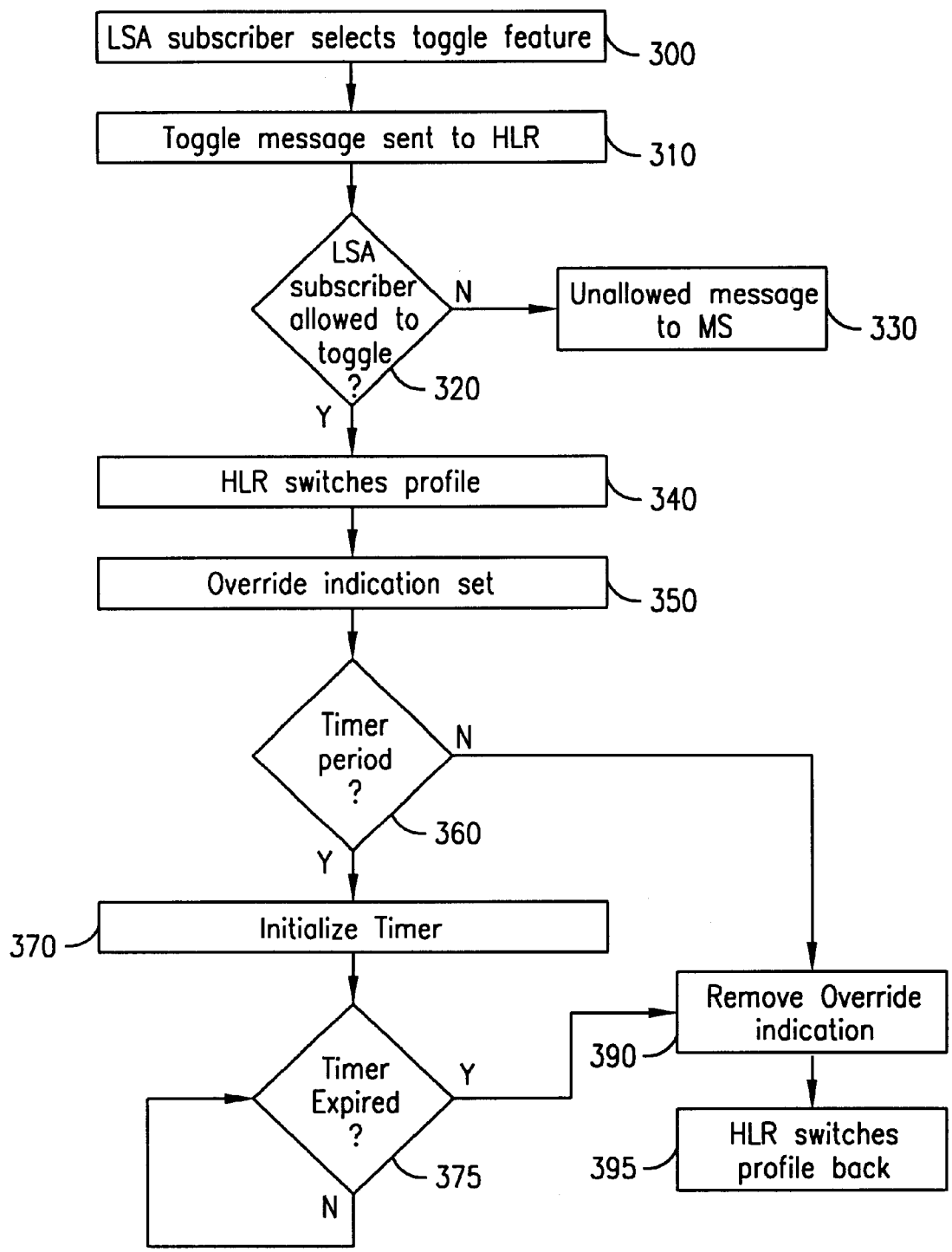
FIG. 3 is an exemplary flow diagram illustrating the selection of a subscriber profile.

With reference now to the steps listed in FIG. 3 of the drawings, which will be described in connection with FIG. 2 of the drawings, an LSA subscriber is shown having at least two different subscriber profiles 35a and 35b stored in the HLR 26 associated with that LSA subscriber. If the LSA subscriber would like to toggle the current subscriber profile 35, the LSA subscriber can select the toggle feature (step 300), using one of the methods described above (dedicated switch, service code, or menu-driven system). If the toggle feature is selected with the MS 20, the MS 20 sends the toggle message 40, preferably with a selected profile option 42 and time period 44 that the selected profile option 42 should remain in effect, to the HLR 26 (step 310). If the toggle feature is selected using the WAP, the LSA subscriber sends the toggle message 40 to the HLR 26 via the Internet.

In either case, once the HLR 26 receives the toggle message 40, the HLR 26 accesses the subscriber record 30 associated with the LSA subscriber to determine if the LSA subscriber is allowed to use the toggle feature, for example, by determining whether the toggle indication 32 is included in the subscriber record 30 (step 320). If not, the HLR 26 sends an unallowed message to the MS 20 or LSA subscriber (step 330). If so, the HLR 26 switches the subscriber profile 35 to the other subscriber profile or the subscriber profile corresponding to the selected profile option 42 (step 340), and sets the override indication 36 (step 350).

At this point, if a time period 44 is sent or stored in the subscriber record 30 (step 360), the HLR 26 initiates the timer 38 with the time period 44 (step 370). If a time period 44 is not sent or stored in the subscriber record 30, the HLR 26 simply removes the override indication 36 (step 390) and switches the subscriber profile 35 back (step 395). For example, the HLR 26 can remove the override indication 36 and switch the subscriber profile 35 back the next time that the profile designation would normally change or the next time that the original subscriber profile 35 would normally be in effect. If the timer 38 is activated (step 370), at the expiration of the timer (step 375), the HLR 26 removes the override indication 36 (step 390). At this point, whatever the current subscriber profile would normally be is activated (step 395).

Figure 4:
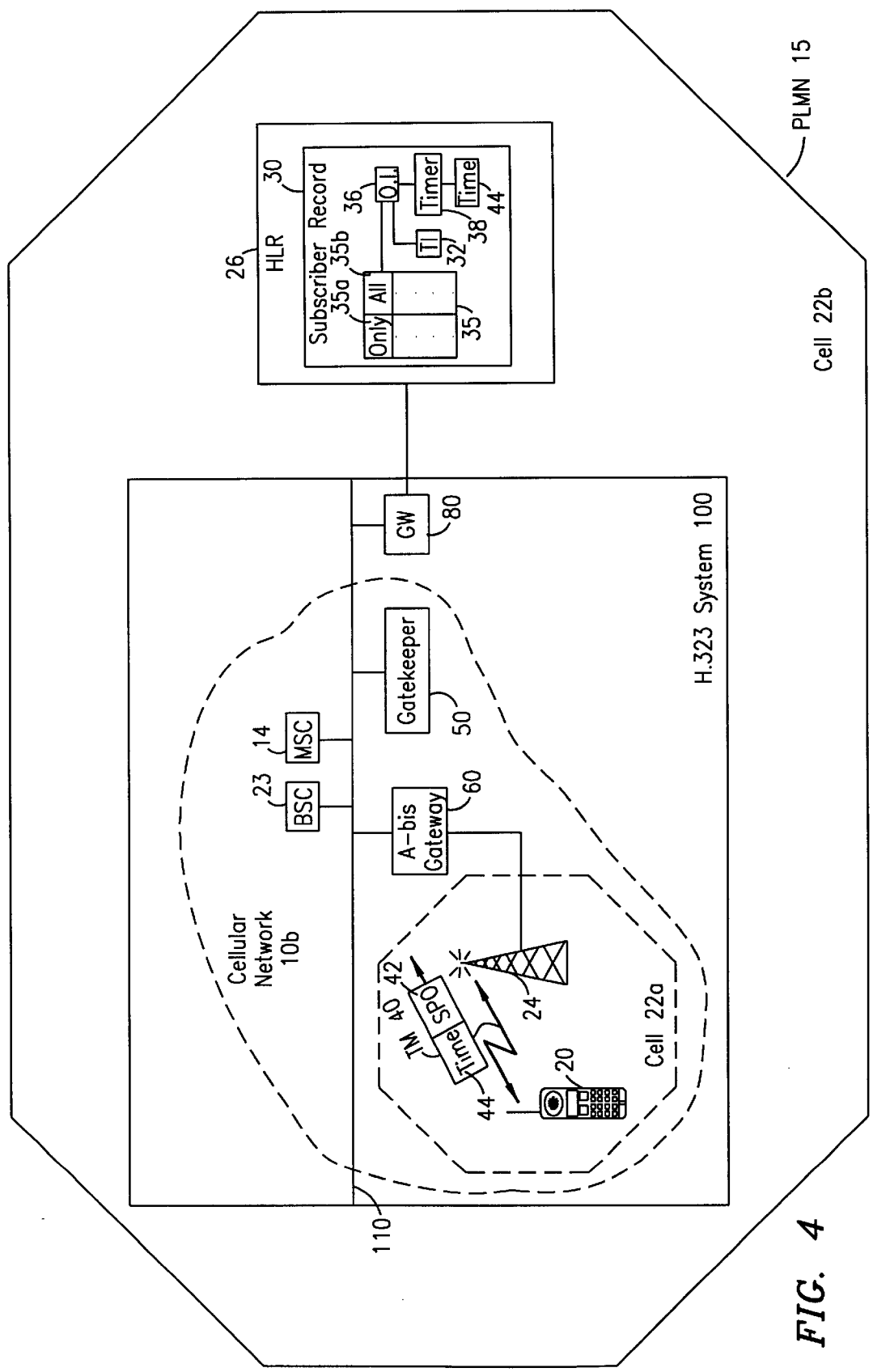
FIG. 4 is an exemplary block diagram illustrating the selection of a subscriber profile by an H.323 mobile subscriber.

As shown in FIG. 4 of the drawings, another type of business indoor network 10 is the GSM over the Net 10b, which utilizes the H.323 protocol to transmit voice and/or data via the Transmission Control Protocol over the Internet Protocol (TCP/IP) over a local area network (LAN) backbone 110. Within an H.323 system 100 implementing a GSM cellular network 10b, the GSM cellular network 10b is considered one H.323 endpoint. Other H.323 endpoints can include, for example, a personal computer, or an IP-based telephone (not shown). The GSM cellular network 10b within the H.323 system 100 includes a Gatekeeper 50, a Mobile Switching Center (MSC) 14 for handling mobility management and controlling calls made to and from MSs 20 within the H.323 system 100, a Base Station Controller (BSC) 23 for controlling radio-related functions, such as channel assignment, and at least one A-bis Gateway 60 and associated Base Transceiver Station (BTS) 24, all of which are connected to the LAN backbone 110. It should be noted that the BTS 24 is connected to the LAN backbone 110 via the A-bis Gateway 60.

The A-bis Gateway 60 converts between the circuit-switched signaling and data transport used by the BTS 24 and the packet-switched signaling and data transport used by the H.323 system 100. The BTS 24 operates as a transceiver for transmitting and receiving data and control messages to and from the MS 20 over an air interface 70. It should also be noted that the MSC 14 and BSC 23 can be separate nodes or can be integrated together in one node.

Most of the permanent H.323 subscriber information is stored within the Gatekeeper 50. In addition, the Gatekeeper 50 stores routing information, e.g., the IP address for the MSC 14 and an associated port number for the MS 20. Non-H.323 subscriber information, along with the multiple profiles 35 are stored within the subscriber record 30 within the HLR 26, which could be within the H.323 system 100 or within the PLMN 15, the latter being illustrated.

Figure 5:
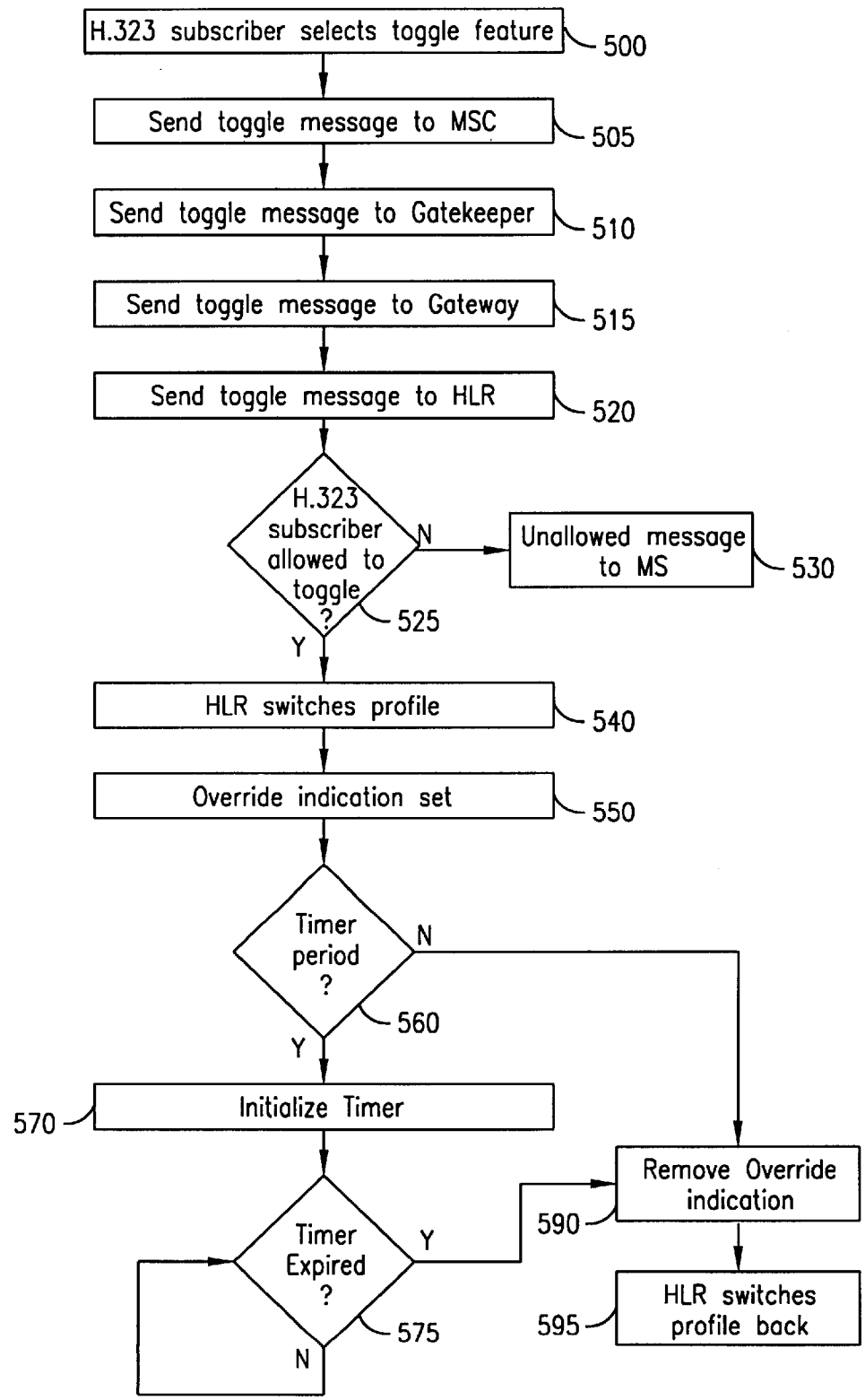
FIG. 5 is an exemplary flow diagram illustrating the selection of a subscriber profile.

Thus, with reference now to the steps listed in FIG. 5 of the drawings, which will be described in connection with FIG. 4 of the drawings, if the H.323 mobile subscriber is located within the cellular network 10b within the H.323 system 100, and wants to toggle his or her subscriber profile 35 from "H.323-only" access 35a to "all" access 35b, the H.323 subscriber can select the toggle feature (step 500), using one of the methods described above (dedicated switch, service code, or menu-driven system). If the toggle feature is selected with the MS 20, the MS 20 sends the toggle message 40, preferably with a selected profile option 42 and time period 44 that the selected profile option 42 should remain in effect, to the HLR 26. If the HLR 26 is within the PLMN 15, as is shown, the toggle message 40 goes through the MSC 14 (step 505), Gatekeeper 50 (step 510) and a Gateway 80 to the circuit-switched network of the PLMN 15 (step 515) before reaching the HLR 26 (step 520). If the toggle feature is selected using the WAP, the LSA subscriber sends the toggle message 40 to the HLR 26 via the Internet (not shown).

In either case, once the HLR 26 receives the toggle message 40, the HLR 26 accesses the subscriber record 30 associated with the LSA subscriber to determine if the LSA subscriber is allowed to use the toggle feature, by, for example, determining whether the toggle indication 32 is included in the subscriber record 30 (step 525). If not, the HLR 26 sends an unallowed message to the MS 20 or LSA subscriber (step 530). If so, the HLR 26 switches the subscriber profile 35 to the other subscriber profile or the subscriber profile corresponding to the selected profile option 42 (step 540), and sets the override indication 36 (step 550).

At this point, if a time period 44 is sent or stored in the subscriber record 30 (step 560), the HLR 26 initiates the timer 38 with the time period 44 (step 570). If a time period 44 is not sent or stored in the subscriber record 30, the HLR 26 simply removes the override indication 36 (step 590) and switches the subscriber profile 35 back (step 595). For example, the HLR 26 can remove the override indication 36 and switch the subscriber profile 35 back the next time that the profile designation would normally change or the next time that the original subscriber profile 35 would normally be in effect. If the timer 38 is activated (step 570), at expiration of the timer 38 (step 575), the HLR 26 removes the override indication 36 (step 590). At this point, whatever the current subscriber profile 35 would normally be is activated (step 595).

It should be noted that the toggling method described above is not limited to the LSA and H.323 systems, but instead can be extended to any type of business indoor cellular network 10, where multiple subscriber profiles 35 based upon time of day are used.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for allowing a business indoor mobile subscriber associated with a business indoor cellular network to choose between at least two subscriber profiles associated with said business indoor mobile subscriber, comprising:
    a subscriber record associated with said business indoor mobile subscriber for storing said at least two subscriber profiles, said at least two subscriber profiles each being associated with a respective type of network access and each being active at a different respective time;
    an override indication within said subscriber record for indicating a selected one of said at least two subscriber profiles is currently active regardless of said times associated with any of the other ones of said at least two subscriber profiles;
    a timer within said subscriber record for monitoring the amount of time said selected subscriber profile has been activated; and
    a home location register for receiving a toggle message from said business indoor subscriber, said toggle message requesting said home location register to set said override indication, said home location register deactivating said selected subscriber profile and activating a second one of said at least two subscriber profiles in response to the expiration of said timer.

2. The telecommunications system of claim 1, wherein said selected subscriber profile is currently active, said home location register extending said time associated with said selected subscriber profile, in response to said toggle message.

3. The telecommunications system of claim 1, wherein said home location register removes said override indication when said home location register deactivates said selected subscriber profile.

4. The telecommunications system of claim 1, wherein said toggle message further includes a timer period for initializing said timer.

5. The telecommunications system of claim 1, wherein said subscriber record further stores a timer period for initializing said timer.

6. The telecommunications system of claim 1, wherein said toggle message is an Unstructured Supplementary Service Data message.

7. The telecommunications system of claim 1, further comprising:
    a mobile station associated with said business indoor subscriber and in wireless communication with said home location register for sending said toggle message to said home location register.

8. The telecommunications system of claim 7, wherein said mobile station includes a dedicated switch for sending said toggle message.

9. The telecommunications system of claim 7, wherein said mobile station sends said toggle message in response to a service code.

10. The telecommunications system of claim 7, wherein said mobile station includes a menu-driven system for sending said toggle message.

11. The telecommunications system of claim 1, wherein said toggle message includes an indication of said selected subscriber profile.

12. The telecommunications system of claim 1, wherein said business indoor cellular network is a localized service area cellular network.

13. The telecommunications system of claim 1, wherein said business indoor cellular network is an H.323 system implementing a cellular network.

14. The telecommunications system of claim 1, wherein said respective types of network access include at least business indoor cellular network only access and all network access.

15. The telecommunications system of claim 1, wherein said subscriber record further comprises:
a toggle indication for indicating whether said business indoor subscriber can request said home location register to activate said selected subscriber profile.

16. A method for allowing a business indoor mobile subscriber associated with a business indoor cellular network to choose between at least two subscriber profiles associated with said business indoor mobile subscriber, comprising the steps of:
storing within a subscriber record associated with said business indoor mobile subscriber at least two subscriber profiles, said at least two subscriber profiles each being associated with a respective type of network access and each being active at a different respective time;
receiving, at a home location register storing said subscriber record, a toggle message from said business indoor subscriber;
in response to said toggle message, setting, by said home location register, an override indicator to indicate a select one of said at least two subscriber profiles is currently active regardless of said times associated with any of the other ones of said at least two subscriber profiles;
initiating a timer to monitor the amount of time said selected subscriber profile has been activated; and
deactivating said selected subscriber profile and activating a second one of said at least two subscriber profiles in response to the expiration of said timer.

17. The method of claim 16, further comprising the step of:
deactivating a currently active one of said at least two subscriber profiles.

18. The method of claim 16, wherein said selected subscriber profile is currently active, and wherein said step of setting further comprises the step of:
extending said time associated with said selected subscriber profile.

19. The method of claim 13, further comprising the steps of:
in response to said second step of deactivating, removing said override indication.

20. The method of claim 16, wherein said toggle message further includes a timer period for initializing said timer.

21. The method of claim 16, wherein said subscriber record further stores a timer period for initializing said timer.

22. The method of claim 16, wherein said step of receiving further comprises the step of:
sending said toggle message from a mobile station associated with said business indoor subscriber to said home location register.

23. The method of claim 16, further comprising the step of:
determining whether said subscriber record has a toggle indication therein for indicating that said business indoor subscriber can request said home location register to activate said selected subscriber profile, said step of activating being performed when said toggle indication is present.

24. A home location register associated with a business indoor mobile subscriber that is associated with a business indoor cellular network, comprising:
a subscriber record for storing at least two different subscriber profiles associated with said business indoor subscriber, said at least two subscriber profiles each being associated with a respective type of network access and each being active at a respective time;
a toggle indication for indicating whether said business indoor subscriber can alter a presently active one of said at least two subscriber profiles;
an override indication for indicating a selected one of said at least two subscriber profiles is currently active regardless of said respective times associated with said at least two subscriber profiles, said override indication being set in response to receiving a toggle message from said business indoor subscriber; and
a timer for monitoring the amount of time said selected subscriber profile has been activated, said selected subscriber profile being deactivated and a second one of said at least two subscriber profile being activated in response to the expiration of said timer.

25. The home location register of claim 24, wherein said override indication is removed in response to said home location register deactivating said selected subscriber profile.

* * * * *